(12) United States Patent
Kurata

(10) Patent No.: US 12,306,440 B2
(45) Date of Patent: May 20, 2025

(54) PHOTONIC INTEGRATED OPTICAL DEVICE WITH AN OPTICAL FUNCTIONAL ELEMENT AND PLANAR LIGHTWAVE CIRCUIT

(71) Applicant: Nippon Telegraph and Telephone Corporation, Tokyo (JP)

(72) Inventor: Yu Kurata, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 398 days.

(21) Appl. No.: 18/010,664

(22) PCT Filed: Jun. 29, 2020

(86) PCT No.: PCT/JP2020/025577
§ 371 (c)(1),
(2) Date: Dec. 15, 2022

(87) PCT Pub. No.: WO2022/003794
PCT Pub. Date: Jan. 6, 2022

(65) Prior Publication Data
US 2023/0161104 A1 May 25, 2023

(51) Int. Cl.
*G02B 6/13* (2006.01)
*G02B 6/12* (2006.01)
(52) U.S. Cl.
CPC ...... *G02B 6/13* (2013.01); *G02B 2006/12061* (2013.01)
(58) Field of Classification Search
CPC ...... G02B 6/13; G02B 6/4224; G02B 6/4239; G02B 2006/12061
See application file for complete search history.

(56) References Cited

U.S. PATENT DOCUMENTS

2024/0219639 A1\* 7/2024 Kurata ............... G02B 6/42

FOREIGN PATENT DOCUMENTS

| JP | 2002-062447 A | 2/2002 |
| JP | 2005-070365 A | 3/2005 |
| JP | 2009-093093 A | 4/2009 |

OTHER PUBLICATIONS

Written Opinion of PCT/JP2020/025577 mailed Sep. 29, 2020 (Year: 2020).\*

\* cited by examiner

*Primary Examiner* — Andrew Jordan
(74) *Attorney, Agent, or Firm* — Workman Nydegger

(57) ABSTRACT

A photonic integrated optical device can implement hybrid integration of an optical functional element simply and easily using an optical circuit of a PLC as a platform and allows high accuracy butt-joining of optical waveguides. For that, on the side of an optical circuit on top of a substrate of the PLC, the device uses a butt-joint holding substrate that transmits light in the wavelength region ranging from the UV light band to the visible light band. A UV-cure adhesive is filled into a gap between an optical circuit of the PD and an optical circuit of the PLC and a gap between an end face of a substrate of the PD and an end face of the substrate. This allows a joint to be formed by the UV-cure adhesive filled into the gap between the butt-joining end faces and cured by UV light passing through the substrate.

8 Claims, 10 Drawing Sheets

Fig. 2
(a) 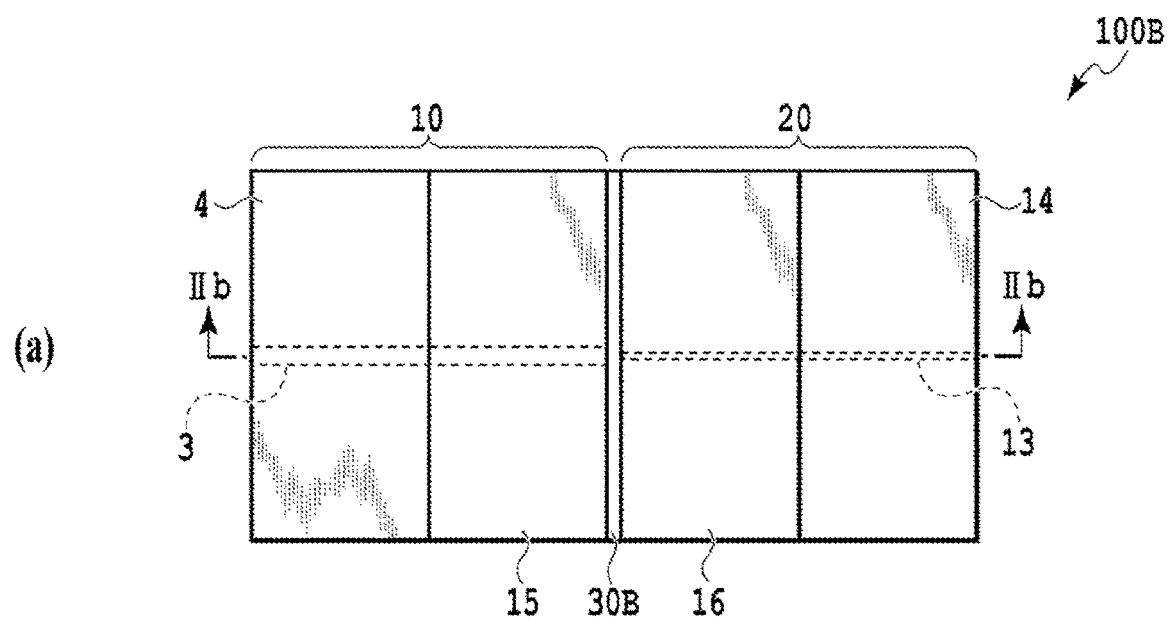
(b) 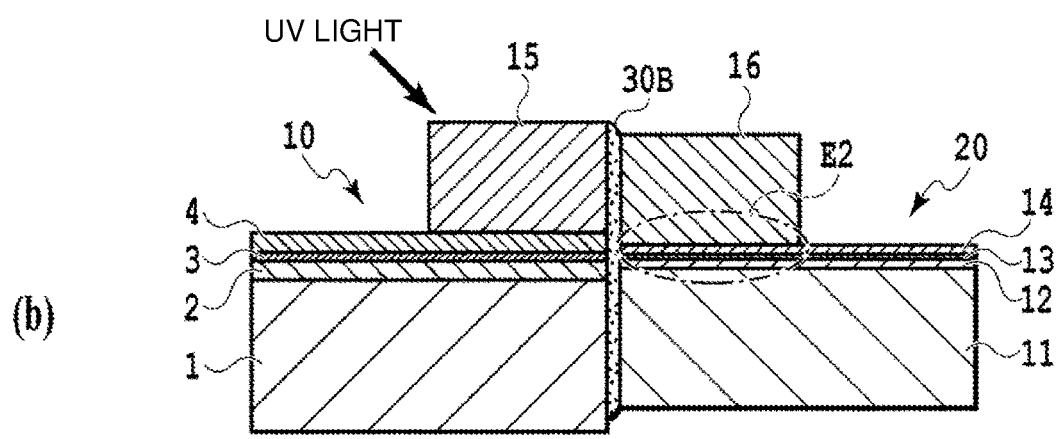

PHOTONIC INTEGRATED OPTICAL DEVICE WITH AN OPTICAL FUNCTIONAL ELEMENT AND PLANAR LIGHTWAVE CIRCUIT

TECHNICAL FIELD

The present invention relates to an photonic integrated optical device applicable to optical communications systems, and more particularly, to an photonic integrated optical device on which optical circuit elements having optical waveguides as well as optical functional elements such as photodiodes and laser diodes are mounted.

BACKGROUND ART

Recently with the spread of optical fiber transmission, there has been demand for techniques for integrating a large number of optical circuits at high density. As one of such techniques, a silica-based planar lightwave circuit (hereinafter abbreviated to PLC) is known. The PLC is a waveguide-type optical device with excellent features such as low losses, high reliability, and high design freedom, and a PLC that integrates functions of a multiplexer/demultiplexer, a coupler, and the like is actually mounted on a transmission device at a transmission end of optical communications.

Other than the PLC, optical devices mounted in a transmission device include optical functional elements such as photodiodes (hereinafter abbreviated to PDs) configured to convert optical signals into electrical signals and laser diodes (hereinafter abbreviated to LDs) serving as light emission sources. Note that the PD and the LD can be regarded as having an input/output structure of an optical waveguide. In order to further expand channel capacity, there is demand for a highly functional photonic integrated optical device produced by integrating an optical waveguide such as a PLC that performs optical signal processing and optical devices such as PDs that perform photoelectric conversion.

As a platform for such an photonic integrated optical device, the PLC is promising, and an optical waveguide component formed by hybrid integration of a PD chip and a PLC chip has been proposed together with a production direction thereof (see Patent Literature 1). Patent Literature 1 describes a method that involves installing a 45-degree mirror in part of a waveguide area, mounting a PD on the waveguide using the mirror to vertically change an optical path of light propagating along the optical waveguide, and optically coupling the PLC to the PD.

A device form in which optical functional elements such as a PLC and a PD are mounted in combination in this way is advantageous in terms of downsizing of the device and design freedom of an optical circuit. Also, in order to expand channel capacity, a multichannel integrated device has been developed by optically coupling and mounting a PLC formed by integration of optical circuit functions such as optical signal multiplexing/demultiplexing functions and arrayed multiple optical functional elements. Furthermore, in order to further increase speed and functionality, recently there has been demand for integration of a PLC and an optical functional element having a waveguide structure such as a PD having a waveguide structure suitable for wider bandwidths and an LD having a wavelength tuning function.

In such a device form, for example, to butt-join respective input and output waveguides of a PLC and an optical functional element, it is necessary to fix the waveguides to each other. In so doing, because it is difficult to fully eliminate a distance between the waveguides due to processing error and mounting error, optical coupling is actually done such that light will be emitted into space from one of the waveguides and a beam of the light will enter the other waveguide.

However, because the emitted beam spreads due to diffraction, an overlap between the emitted beam and a mode field of propagation light on the input-side waveguide is reduced, resulting in a loss, and at the same time reflection occurs due to a difference in index of refraction between end faces of the waveguides and space, resulting in a loss. Consequently, to reduce the losses, it becomes necessary to fill the space with media close in index of refraction to the respective waveguides and transparent to near-infrared light.

Thus, a UV-(ultraviolet-) cure adhesive is used commonly, and, for example, in butt-connection of optical fiber and PLC, both the optical fiber and PLC are centered. Subsequently, the ultraviolet-cure adhesive is filled into a gap between an end face of a glass-made fiber block to which the optical fiber is fixed and an end face of the PLC, irradiated with UV light, and consequently able to be cured in a short time. In this way, the end faces can be bonded together more simply and easily than when a thermosetting adhesive is used. If Si-based or InP-based optical functional elements can be integrated by a butt-joining method using a PLC optical circuit as a platform, a more functional photonic integrated optical device can be provided.

Actually, however, there are some problems in creating an photonic integrated optical device by integrating optical functional elements by the application of the butt-joining method using a PLC optical circuit as a platform.

FIGS. 1(a) and 1(b) are diagrams showing a basic configuration of an example of a well-known photonic integrated optical device 100A, where FIG. 1(a) is a plan view of the photonic integrated optical device 100A as viewed from above and FIG. 1(b) is a sectional side view of the photonic integrated optical device 100A taken along line Ib-Ib in FIG. 1(a).

Referring to FIGS. 1(a) and 1(b), the photonic integrated optical device 100A is configured by butting together a PLC 10 and an optical functional element 20, filling a UV-cure adhesive into a gap between butted portions, irradiating the adhesive with UV light, and thereby curing the adhesive and forming a joint 30A.

The PLC 10 is configured by laminating an underclad layer 2, a core layer 3, and an overclad layer 4, and thereby forming an optical circuit on top of a first main surface of a substrate 1. Similarly, the optical functional element 20 is configured by laminating an underclad layer 12, a core layer 13, and an overclad layer 14, and thereby forming an optical circuit on top of a substrate 11. Here, the PLC 10 is larger in board thickness than the optical functional element 20. The optical circuit of the PLC 10 is also larger in thickness than the optical circuit of the optical functional element 20. As a material of the substrates 1 and 11, Si or InP is used normally.

The optical circuit of the PLC 10 is made of silica glass transparent to a wavelength region ranging from the UV band to the near-infrared band while on the other hand, the substrate 1 is made of a material non-transparent to light in a wavelength region ranging from the UV band to the visible light band. These configurations similarly apply to the optical circuit of the optical functional element 20 and to the substrate 11 on the other side of the connection. That is, the substrates 1 and 11, which are not transparent to light in the wavelength region ranging from the UV band to the visible light band, absorb rays in this wavelength region.

To produce the photonic integrated optical device 100A by butt-joining, the substrates 1 and 11 are created from a material non-transparent to light in the wavelength region ranging from the UV band to the visible light band, combined, and joined together. In this case, the core layers 3 and 13, which are to become the optical waveguides of the optical circuits on top of the substrates 1 and 11, are centered with respect to each other, and then a UV-cure adhesive is filled into a gap between end faces of these parts. Then, when UV light is emitted vertically from above, the optical circuits as well as the substrates 1 and 11 are fixed together adhesively, allowing the joint 30A to be formed.

However, the emitted UV light, which is absorbed by the substrates 1 and 11 without being transmitted therethrough, is unreachable to most of a region to be bonded as with a region E1 shown in FIG. 1(b), leaving the region uncured. As a result, the UV-cure adhesive cannot be cured completely, and in an incompletely cured state, there is a problem in that sufficient bonding strength is not available in forming the joint 30A in terms of the structure of the photonic integrated optical device 100A.

FIGS. 2(a) and 2(b) are diagrams showing a basic configuration of another example of a well-known photonic integrated optical device 100B, where FIG. 2(a) is a plan view of the photonic integrated optical device 100B as viewed from above and FIG. 2(b) is a sectional side view of the photonic integrated optical device 100B taken along line IIb-IIb in FIG. 2(a).

Referring to FIGS. 2(a) and 2(b), in the photonic integrated optical device 100B, when the PLC 10 and the optical functional element 20 are butted together, butt-joint holding substrates 15 and 16 equal in board thickness are provided on the side of the optical circuits on top of the substrates 1 and 11. It is assumed that a glass material that transmits UV light is used for the substrates 15 and 16, for example. Then, a UV-cure adhesive is filled into a gap between butted portions, irradiated with UV light, and thereby cured to form a joint 30B.

Thus, to produce the photonic integrated optical device 100B by butt-joining, the substrates 15 and 16 are mounted on top of the optical circuits on the PLC 10 and optical functional element 20, combined, and joined together. In this case, the core layers 3 and 13, which are to become the optical waveguides of the optical circuits are centered with respect to each other, and then, when the PLC 10 and the optical functional element 20 are butt-joined, the substrates 15 and 16 on top thereof are butted together at the same time, and a UV-cure adhesive is filled into a gap between end faces of these parts. Then, when UV light is emitted obliquely from above, the substrates 1 and 11 are fixed together adhesively, so are the optical circuits, as well as the substrates 15 and 16, allowing the joint 30B to be formed.

However, it is often necessary to provide free space on the optical circuit on top of the optical functional element 20 for the purpose of installing an electrode pad for use to drive, for example, a LD, a PD, or the like. In such a case, in the optical circuit of the optical functional element 20, a region E2 shown in FIG. 2(b) becomes an extra occupation area to mount the substrate 16, making it difficult to mount the substrate 16 while providing necessary free space. In other words, the occupation area used to mount the substrate 16 acts as an impediment to securing necessary free space. To provide a special area separately to mount such a substrate 16 is not a good measure because such a measure will increase the size of the optical functional element 20 and decrease the level of integration.

FIGS. 3(a) and 3(b) are diagrams showing a basic configuration of still another example of a well-known photonic integrated optical device 100C, where FIG. 3(a) is a plan view of the photonic integrated optical device 100C as viewed from above and FIG. 3(b) is a sectional side view of the photonic integrated optical device 100C taken along line IIIb-IIIb in FIG. 3(a).

Referring to FIGS. 3(a) and 3(b), in the photonic integrated optical device 100C, when the PLC 10 and the optical functional element 20 are butted together, butt-joint holding substrate 17 and 18 equal in board thickness are provided on undersides of second main surfaces of the respective substrates 1 and 11. However, it is assumed that a glass material that transmits, for example, UV light is used for the substrates 17 and 18. Then, a UV-cure adhesive is filled into a gap between butted portions, irradiated with UV light, and thereby cured to form a joint 30C.

Thus, to produce the photonic integrated optical device 100C by butt-joining, other substrates 17 and 18 are mounted on undersides of the substrates 1 and 11 of the PLC 10 and the optical functional element 20, combined, and joined together. In this case, the core layers 3 and 13, which are to become the optical waveguides of the optical circuits are centered with respect to each other, and then, when the PLC 10 and the optical functional element 20 are butt-joined, the substrates 17 and 18 on undersides of the PLC 10 and the optical functional element 20 are butted together at the same time, and a UV-cure adhesive is filled into a gap between end faces of these parts. Then, when UV light is emitted obliquely from below, the substrates 17 and 18 are fixed together adhesively, so are the optical circuits, as well as the substrates 1 and 11, allowing the joint 30C to be formed.

However, when other substrates 17 and 18 are mounted on the undersides of the substrates 1 and 11, although the substrates 17 and 18 can be fixed adhesively to each other by avoiding the problem with the photonic integrated optical device 100B, a large amount of the UV-cure adhesive remains uncured on end faces of the substrates 1 and 11. A reason for this is that UV light is absorbed by the substrates 1 and 11 without being transmitted therethrough as described above and the UV-cure adhesive in a region E3 shown in FIG. 3(b) is left uncured. As a result, as with the photonic integrated optical device 100A, the UV-cure adhesive cannot be cured completely, and in an incompletely cured state, there is a problem in that sufficient bonding strength is not available in forming the joint 30° C. in terms of the structure of the photonic integrated optical device 100C.

That is, with the photonic integrated optical devices 100A and 100C, the formation of the joints 30A and 30C, which do not provide sufficient bonding strength, cannot be said to be an effective technique from the viewpoint of long-term reliability. With the photonic integrated optical device 100B, the joint holding substrate 16 is not easy to install on the optical circuit on top of the substrate 11 of the optical functional element 20 and acts as an impediment to securing free space necessary for the optical circuit, and thus, this cannot be said to be an effective technique.

CITATION LIST

Patent Literature

Patent Literature 1: Japanese Patent Laid-Open No. 2005-70365

SUMMARY OF THE INVENTION

Technical Problem

The present invention has been made to solve the above problems. An object of an embodiment of the present invention is to provide an photonic integrated optical device that allows hybrid integration of an optical functional element to be implemented simply and easily using a PLC optical circuit as a platform and allows high accuracy butt-joining of optical waveguides.

Means for Solving the Problem

To achieve the above object, according to one aspect of the present invention, there is provided an photonic integrated optical device, comprising: a planar lightwave circuit made up of an optical circuit made of a material transparent to light in a wavelength region ranging from an ultraviolet band to a visible light band provided on top of a first main surface of a substrate made of a material non-transparent to light in the wavelength region ranging from the ultraviolet band to the visible light band; an optical functional element made up of an optical circuit made of the material transparent to light in the wavelength region ranging from the ultraviolet band to the visible light band provided on an underside of a second main surface of a substrate made of the material non-transparent to light in the wavelength region ranging from the ultraviolet band to the visible light band; a butt-joint made of the material transparent to light in the wavelength region ranging from the ultraviolet band to the visible light band, and holding substrate installed on top of the optical circuit of the planar lightwave circuit and used for joining by means of a ultraviolet-cure adhesive by being butted against an end face of the optical functional element; and, a joint in which respective optical waveguides of the optical circuits are centered with respect to each other, the joint including the ultraviolet-cure adhesive used to butt-join the planar lightwave circuit and the optical functional element, wherein the joint is formed with the ultraviolet-cure adhesive being cured after being filled into a gap between the optical circuit of the optical functional element and the optical circuit of the planar lightwave circuit and a gap between an end face of the substrate of the optical functional element and an end face of the butt-joint holding substrate.

Effects of the Invention

The structure according to the aspect described above makes it possible to butt together the optical waveguides accurately and thereby obtain sufficient bonding strength when forming the joint by curing the UV-cure adhesive after the respective optical waveguides of the optical circuits are centered with respect to each other by butting together the PLC and the optical functional element. This makes it possible to provide an photonic integrated optical device that allows hybrid integration of an optical functional element to be implemented simply and easily using a PLC optical circuit as a platform and allows high accuracy butt-joining of optical waveguides, at low cost.

BRIEF DESCRIPTION OF DRAWINGS

FIG. 1(a) is a plan view of the photonic integrated optical device as viewed from above and FIG. 1(b) is a sectional side view of the photonic integrated optical device taken along line Ib-Ib in FIG. 1(a).

FIGS. 2(a) and 2(b) are diagrams showing a basic configuration of another example of a well-known photonic integrated optical device, where FIG. 2(a) is a plan view of the photonic integrated optical device as viewed from above and FIG. 2(b) is a sectional side view of the photonic integrated optical device taken along line IIb-IIb in FIG. 2(a).

FIG. 3(a) is a plan view of the photonic integrated optical device as viewed from above and FIG. 3(b) is a sectional side view of the photonic integrated optical device taken along line IIIb-IIIb in FIG. 3(a).

FIG. 4(a) is a plan view of the photonic integrated optical device as viewed from above and FIG. 4(b) is a sectional side view of the photonic integrated optical device taken along line IVb-IVb in FIG. 4(a).

FIG. 6(a) is a top view of the butt-joined portion, FIG. 6(b) is a sectional side view taken along line VIb-VIb in FIG. 6(a), and FIG. 6(c) is a plan view of the butt-joined portion during prealignment with a marker used in a place where propagation of light through core layers is not obstructed.

FIG. 9(a) is a top view of the butt-joined portion, FIG. 9(b) is a sectional side view taken along line IXb-IXb in FIG. 9(a), FIG. 9(c) is a plan view of the butt-joined portion during alignment using a groove and a groove marker, and FIG. 9(d) is a plan view of the butt-joined portion during prealignment using metal markers.

DESCRIPTION OF EMBODIMENTS

Photonic integrated optical devices according to a few embodiments of the present invention will be described in detail below with reference to the accompanying drawings.

Embodiment 1

Figure 1:
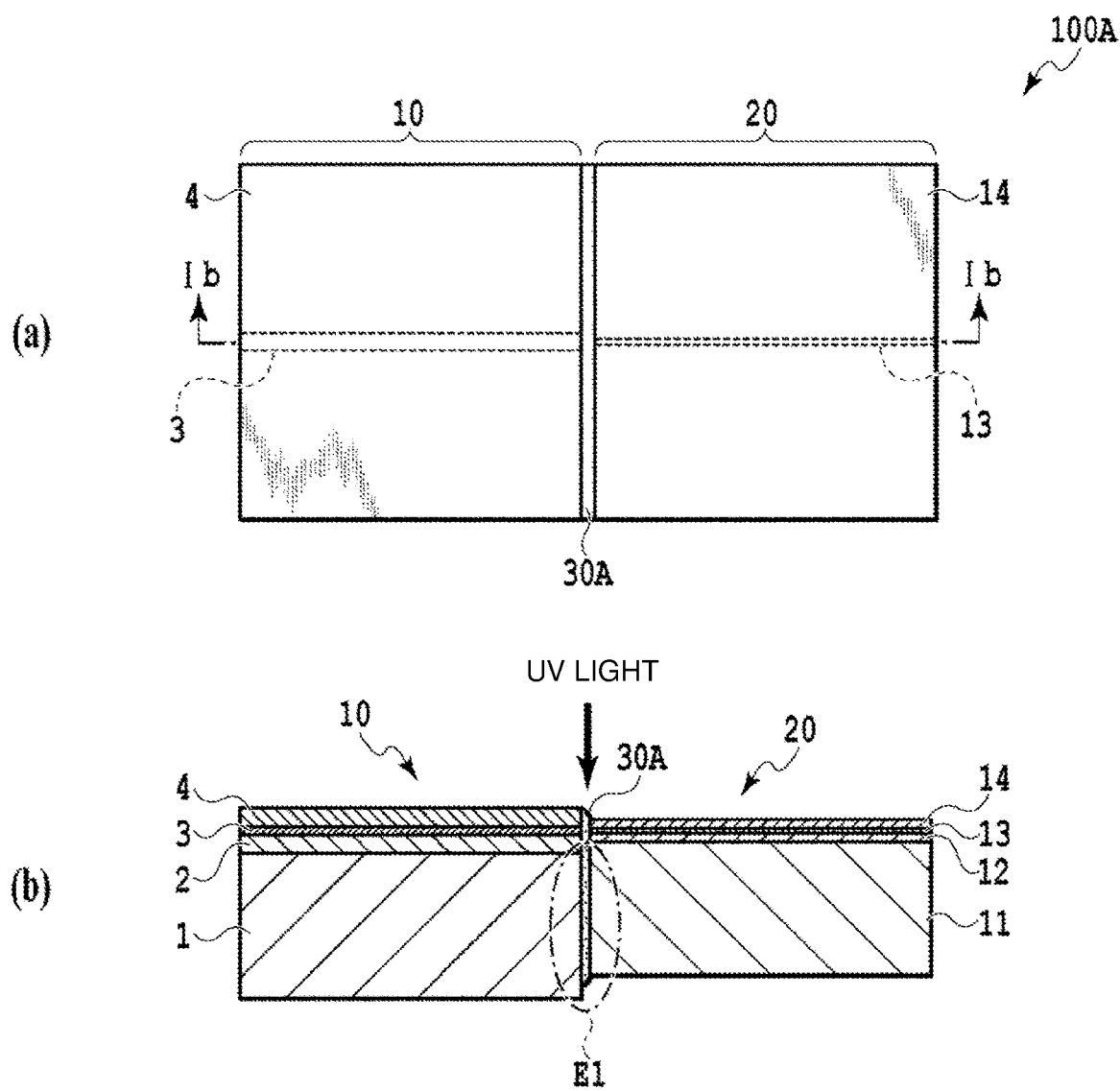
FIGS. 1(a) and 1(b) are diagrams showing a basic configuration of an example of a well-known photonic integrated optical device, where
Figure 3:
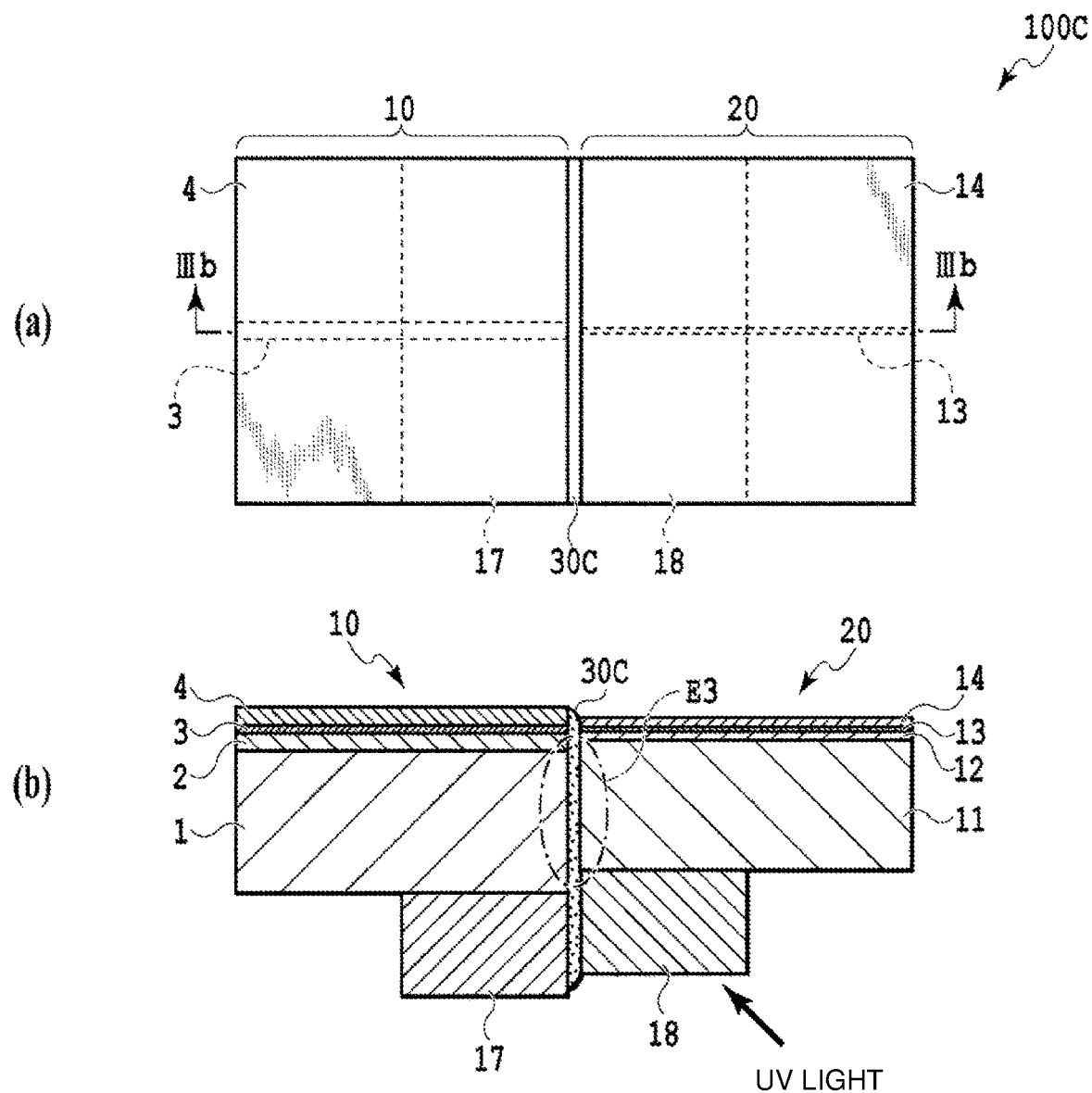
FIGS. 3(a) and 3(b) are diagrams showing a basic configuration of still another example of a well-known photonic integrated optical device, where
Figure 4:
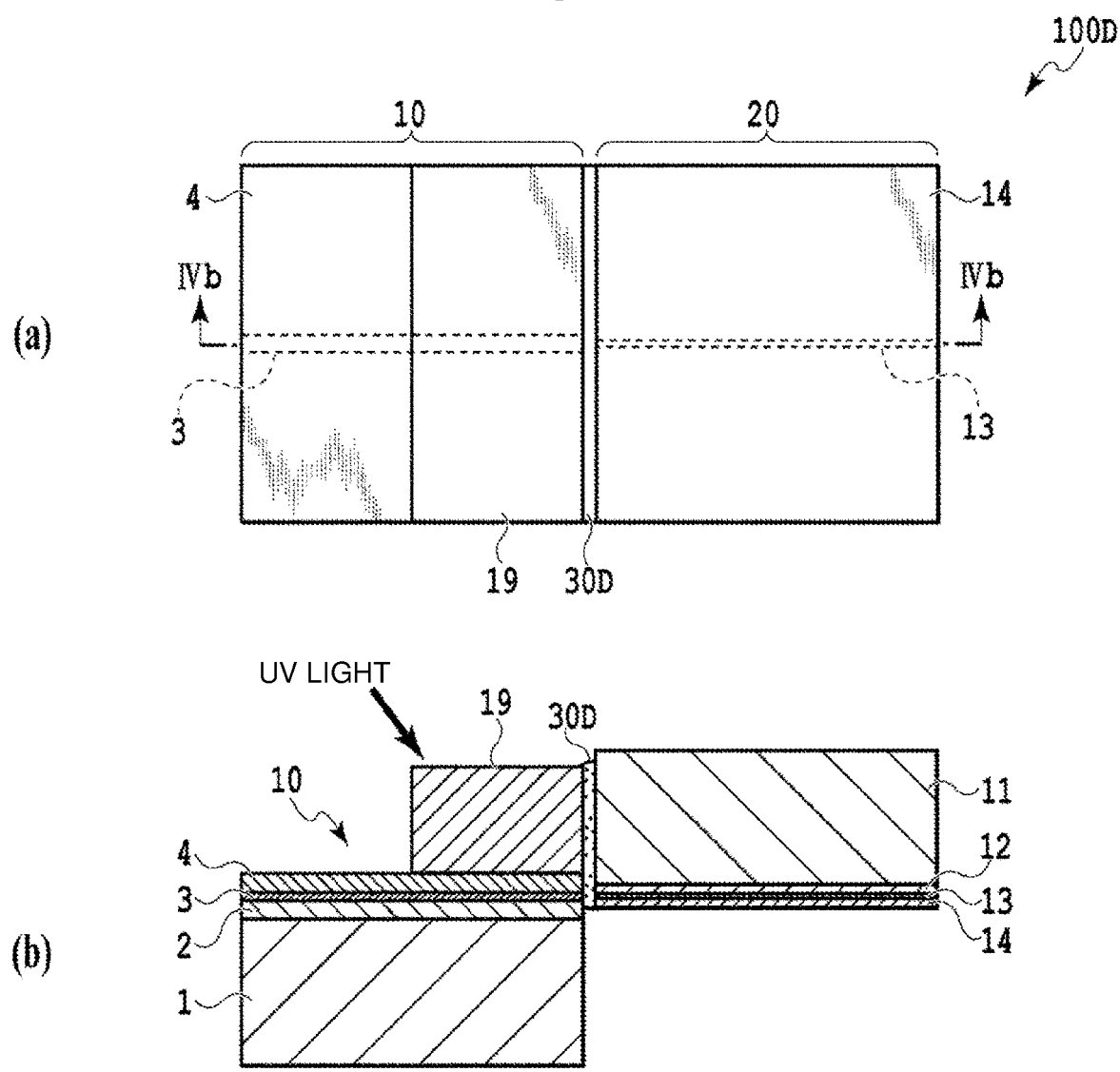
FIGS. 4(a) and 4(b) are diagrams showing a basic configuration of an photonic integrated optical device according to Embodiment 1 of the present invention, where

FIGS. 4(a) and 4(b) are diagrams showing a basic configuration of an photonic integrated optical device 100D according to Embodiment 1 of the present invention, where FIG. 4(a) is a plan view of the photonic integrated optical device 100D as viewed from above and FIG. 4(b) is a sectional side view of the photonic integrated optical device 100D taken along line IVb-IVb in FIG. 4(a).

Referring to FIGS. 4(a) and 4(b), in the photonic integrated optical device 100D, a PLC 10 and an optical functional element 20 are butt-joined together using a butt-joint holding substrate 19 mounted and fixed to top of a first main surface of a substrate 1 on the side of an optical circuit. However, it is assumed that a glass material that transmits, for example, light in a wavelength region ranging from the UV band to the visible light band is used for the substrate 19. Regarding the optical functional element 20, the substrate 11 is used by being turned over such that a second main surface of the substrate 11 will be on the top side, and a UV-cure adhesive is filled into a gap between butted portions, irradiated with UV light, and thereby cured, forming a joint 30D.

Again, the PLC 10 is configured by laminating an underclad layer 2, a core layer 3, and an overclad layer 4, thereby forming an optical circuit on top of a first main surface of the substrate 1. Similarly, the optical functional element 20 is configured by laminating an underclad layer 12, a core layer 13, and an overclad layer 14, thereby forming an optical circuit on top of the substrate 11. Here, the PLC 10 is slightly larger in board thickness than the optical functional element 20. The optical circuit of the PLC 10 is also larger in thickness than the optical circuit of the optical functional element 20. As a material of the substrates 1 and 11, Si or InP is used normally.

That is, the photonic integrated optical device 100D, includes the butt-joint holding substrate 19 installed on top of the optical circuit of the PLC 10, and used for joining by means of an UV-cure adhesive by being butted against an end face of the optical functional element 20. The substrate 1 of the PLC 10 and the substrate 11 of the optical functional element 20 are made of a material non-transparent to light in a wavelength region ranging from a UV band to a visible light band. In contrast, the optical circuit of the PLC 10, the optical circuit of the optical functional element 20, and the substrate 19 are made of a transparent material that transmits light in the wavelength region ranging from the UV band to the visible light band. The joint 30D described above is formed by a UV-cure adhesive cured after being filled into a gap between the optical circuit of the optical functional element 20 and the optical circuit of the PLC 10. The joint 30D is formed by a similar UV-cure adhesive cured after being filled into a gap between an end face of the substrate 11 of the optical functional element 20 and an end face of the butt-joint holding substrate 19.

That is, in the PLC 10 of the photonic integrated optical device 100D, the substrate 19 is mounted on top of the substrate 1 using an adhesive or the like such that an end face of the optical circuit on top of the substrate 1 and the end face of the butt-joint holding substrate 19 will be flush with an output end face of the optical circuit. Also, in the optical functional element 20, the core layer 13 in which the optical waveguide of the optical circuit on an underside of the substrate 11 is formed and the core layer 3 in which the optical waveguide of the optical circuit on top of the substrate 1 of the PLC 10 is formed are butted together such that layer surfaces of the core layers 3 and 13 will be parallel to each other. In this way, the end faces of the respective optical circuits of the PLC 10 and optical functional element 20 are butted together and centered. In so doing, as the substrate 1 of the PLC 10 and the substrate 11 of the optical functional element 20 are placed in a diagonal direction, the end face of the butt-joint holding substrate 19 and the end face of the optical circuit of the PLC 10 are butted against the end face of the optical circuit of the optical functional element 20 and the end face of the substrate 11.

In the photonic integrated optical device 100D, it is assumed that with the PLC 10 and the optical functional element 20 being butted together, the optical waveguides of the respective optical circuits are centered with respect to each other, and then the UV-cure adhesive is cured, thereby forming the joint 30D. The photonic integrated optical device 100D is structured such that in forming the joint 30D, the optical waveguides will be butted against each other accurately to provide sufficient bonding strength. Consequently, hybrid integration of the optical functional element 20 can be implemented simply and easily using the optical circuit of the PLC 10 as a platform and the optical waveguides can be butt-joined accurately, and thus the photonic integrated optical device 100D can be provided at low cost.

Giving a concrete description with reference to FIGS. 4(a) and 4(b), in the PLC 10, with reference to a top side of the substrate 1 made of Si that does not transmit light ranging from UV to visible light, the optical functional element 20 and the core layer 3 for input and output of signals are provided above a neighborhood of an end face of the substrate 1. The butt-joint holding substrate 19 is mounted and fixed to top of the substrate 1 using an adhesive or the like such that the end face of the substrate 19 that transmits light in a region ranging from the UV band to the visible light band will be flush with an input/output end face of an optical circuit of the substrate 1. This configuration may be called an optical circuit chip.

In contrast, in the optical functional element 20, an optical circuit is provided on an underside of the substrate 11 made of Si or InP that does not transmit light ranging from UV to visible light and the core layer 13 for input and output of signals are provided near the end face of the optical circuit with reference to an underside of the substrate 11. This configuration may be called an optical functional element chip. The cores of the optical waveguides are centered with respect to each other via the end faces of the optical circuit chip and optical functional element chip such that the core layer 3 of the optical circuit chip and the core layer 13 of the optical functional element chip will have layer surfaces parallel to each other. At the same time, the substrate 1 of the optical circuit chip and the substrate 11 of the optical functional element chip are placed in a diagonal direction with respect to the layer surfaces of the core layers 3 and 13. Consequently, the end face of the butt-joint holding substrate 19 and the end face of the substrate 11 of the optical functional element chip are placed facing each other on butt-joining end faces.

Thus, as shown in FIG. 4(b), the joint 30D can be formed by curing the UV-cure adhesive filled into a gap between the butt-joining end faces with UV light transmitted through the butt-joint holding substrate 19. This makes it possible to increase bonding area and enable butt-joining of the two chips with increased bonding strength, without providing a fixing substrate on the side of the optical functional element 20.

In the photonic integrated optical device 100D described above, the butt-joint holding substrate 19 that transmits light in the region ranging from the UV band to the visible light is provided on top of the PLC 10, and the substrates 1 and 11 are placed in a diagonal direction with respect to the layer surfaces of the core layers 3 and 13 during butt-joining. This configuration makes it possible to increase bonding area and thereby increase bonding strength without providing a fixing substrate on the optical functional element 20, and thus can reduce the number of parts and man-hours, eliminating the need to change the design of the optical functional element 20. Besides, being able to greatly reduce the amount of adhesive left uncured without transmitting UV light, the configuration is desirable from the viewpoint of long-term reliability. This makes it possible to implement butt-joining of the optical circuit chip and the optical functional element chip simply and easily.

Generally, in a sectional structure of the PLC 10, as an example, a $SiO_2$ thin film is deposited to a thickness of approximately 20 μm as an underclad layer 2, a $SiO_2$ thin film doped with Ge and the like and higher in index of refraction than the clad layers is deposited to a thickness of 3 to 10 μm as a core layer 3, and a $SiO_2$ thin film is deposited to a thickness of approximately 20 μm as an overclad layer 4, on top of a Si substrate 1. In this way, a basic structure of the PLC 10 in which the optical circuit of the PLC 10 is provided on the Si substrate 1 is applied to Embodiment 1.

In a sectional structure of the optical functional element 20, as an example, a $SiO_2$ thin film is deposited to a thickness of a few μm as an underclad layer 12, a Si thin film is deposited to a thickness of a few hundred nm as a core layer 13, and a $SiO_2$ thin film is deposited to a thickness of a few μm as an overclad layer 14, on the underside of the Si substrate 11. In this way, a basic configuration of the optical functional element 20 in which a Si photonic optical circuit is provided on the underside of the Si substrate 11 is applied to Embodiment 1.

Note that in the optical functional element 20 that uses an InP substrate 11, as an example, assuming that the substrate 11 is assimilated with the underclad layer 12, a compound semiconductor is deposited to a thickness of a few hundred nm as a core layer 13 and an InP film or a SiN or $SiO_2$ thin film for passivation is deposited as an overclad layer 14. By assuming the core layer 13 formed in an end face area of the substrate 11 to be an optical waveguide for input and output of signals, optical coupling is done in a mode field on an end face.

A UV-cure adhesive is filled into a gap between the optical circuit of the optical functional element 20 and the optical circuit of the PLC 10 and a gap between an end face of the substrate 11 of the optical functional element 20 and an end face of the butt-joint holding substrate 19. Consequently, the joint 30D is formed with the UV-cure adhesive being cured. In so doing, to increase the strength of adhesive fixing to the optical functional element 20, desirably the substrate 19 is equal to or larger than the substrate 11 in thickness. This will cause UV light to reach the UV-cure adhesive sufficiently and allows filling condition of the UV-cure adhesive to be checked. As a transparent material that transmits light in a wavelength region ranging from the UV band to the visible light band, desirably silica glass, which is a vitreous material, is used for the substrate 19.

On the end face of the substrate 19, preferably the thickness of the UV-cure adhesive is controlled according to optical coupling efficiency and adhesive curing conditions, making it possible to adjust the thickness of the UV-cure adhesive filled into a gap between an end face of the optical circuit on top of the substrate 1 and an end face of the optical functional element 20. In so doing, desirably a bonding end face of the optical circuit on top of the substrate 1 and a bonding end face of the optical circuit on the underside of the substrate 11 are installed so as to be flush with each other.

In performing centering of respective optical waveguides (cores) of the core layers 3 and 13 with respect to each other during butt-joining, in order to perform alignment efficiently, rough alignment is often performed through image observation as a pre-stage. According to the present embodiment, the substrates 1 and 11 are placed in a diagonal direction with respect to the layer surfaces of the core layers 3 and 13. For that, in the alignment of the core layers 3 and 13, in order to observe the optical circuits or the substrates 1 and 11 not only from above, but also from below, it is necessary to install an additional device such as a camera. In such a case, however, in joining together a particularly small optical functional element 20 and PLC 10, there is a problem in that the camera on the underside will cause interference.

Thus, desirably alignment markers for use during butting are provided near an input/output end face of the optical circuit of the PLC 10 as well as near an input/output end face of the optical circuit of the optical functional element 20. The alignment markers can be provided in such places on butt-joining end faces between the optical circuit of the PLC 10 and the optical circuit of the optical functional element 20 that do not obstruct light propagation through the core layers 3 and 13 on which optical waveguides are formed. Then, the light can be observed through the substrate 19 in a direction diagonal to a direction normal to the plane of the substrate 1 of the optical circuit of the PLC 10. This makes it possible to easily implement alignment without the need to add a camera. The core layers 3 and 13, whose widths are on the order of a few microns, are difficult to align accurately through camera observation, but the core layers 3 and 13 can be observed easily even through a camera if a marker larger in size than the core layers 3 and 13 is provided separately near the butt-joining end faces.

Furthermore, the use of a vernier marker will make it possible to implement alignment with submicron level high accuracy even in the case of camera observation. Such a marker structure, if provided in such a place that do not obstruct light propagation by avoiding the optical waveguides (cores) of the core layers 3 and 13, can be introduced into the PLC 10 and the optical functional element 20 without requiring any additional process. Specifically, possible places include a $SiO_2$ layer containing dopants in the case of the PLC 10, a Si layer in the case of Si photonics on an optical circuit, and a compound semiconductor in the case of InP. In so doing, if camera observation is carried out in a vertical direction of the butt-joining end faces, the core layers 3 and 13, which are low in height due to Si photonics or InP, are difficult to observe. Thus, if camera observation is carried out diagonally with respect to a direction normal to the plane of the substrate 11 of the optical functional element 20 as with the present embodiment, the top faces of the core layers 3 and 13 rather than end faces of the core layers 3 and 13 can be observed obliquely. The observation carried out in this way improves visibility of the core layers 3 and 13 because the core layers 3 and 13 are stretched in a horizontal direction of the substrates 1 and 11 and the depth is observed as being extended by just that much.

Therefore, desirably a marker is provided near the end faces where light propagation through the core layers 3 and 13 is not obstructed. In the PLC 10, since the $SiO_2$ core layer 3 containing dopants exists between the $SiO_2$ underclad layer 2 and overclad layer 4, the core layer 3 has a relatively small difference in index of refraction from the underclad layer 2 and the overclad layer 4. This results in low contrast, which makes the contour of a structure look blurred. In the case of the optical functional element 20, when the core layer 13 is observed obliquely in the horizontal depth direction of the substrate 11, the length in the depth direction is limited by the thickness of the underclad layer 12. In such a case, in order to perform alignment more accurately, desirably a marker is provided near the butt-joining end faces by creating a metal pattern on the top face of the overclad layer 14.

The use of a metal marker on the top face of the PLC 10 improves visibility compared to the marker on the core layer 3. On the optical functional element 20, since the thickness of the metal pattern on the top face of the overclad layer 14 is added to the thickness of the underclad layer 12, the length of the marker in the horizontal depth direction of the substrate 11 is increased in observation range accordingly when the marker is observed obliquely. In the case of an array joint that includes two or more combinations of the core layers 3 and 13 to be butt-joined, in order to perform alignment accurately, desirably corresponding markers are provided at two or more locations on respective end faces of the optical circuit and the optical functional element 20. If alignment is performed including the butt-joining end faces and vertical axis such that the markers will be aligned with each other at two locations, rotations around an axis vertical to the butt-joining end faces can also be aligned through camera observation.

The marker-based alignment described above enables accurate alignment in the horizontal direction of the substrates 1 and 11. In contrast, in order to accurately perform alignment in the directions normal to the planes of the substrates 1 and 11, desirably a groove deeper than the underclad layer 12 is provided in the joining end face of the optical functional element 20. For example, if the depth of the groove is set equal to the thickness of the overclad layer 14 on the side of the optical circuit plus half the thickness of the core layer 13, a bottom face of the groove in the end face of the optical functional element 20 corresponds to the overclad layer 14 of the optical circuit, in a butt-joining structure. This makes it possible to improve visibility in camera observation and perform alignment in the direction normal to the substrate 11 accurately. Furthermore, in filling the UV-cure adhesive into a gap between the butt-joining end faces, the existence of the groove in the end face of the optical functional element 20 makes it possible to keep the adhesive from flowing out to a surface of the optical functional element 20 and thereby achieve stable adhesive fixing.

In this way, the optical circuits provided on top of the substrates 1 and 11, respectively, and transparent to light in the region ranging from the UV band to the visible light are butt-joined using the substrate 19 provided on top of the PLC 10 and transparent to light in the region ranging from the UV band to the visible light, to achieve hybrid integration. In this configuration of the photonic integrated optical device, the joint 30D is formed by filling the UV-cure adhesive into a gap between the end faces of the optical circuits toward the top faces of the substrates 1 and 11 such that the end face of the butt-joint holding substrate 19 will be flush with the end faces of the core layers 3 and 13 of the optical circuits, and thereby form the joint 30D. The layer surfaces of the core layers 3 and 13 of the respective optical circuits are centered via the end faces of the optical circuit chip and the optical functional element chip so as to be parallel to each other. If the substrate 1 and the substrate 11 are placed diagonally with respect to the layer surfaces of the core layers 3 and 13, the end face of the substrate 19 and the end face of the substrate 11 are placed facing each other as butt-joining end faces. This makes it possible to cure the UV-cure adhesive filled into the gap between the butt-joining end faces, using UV light passing through the substrate 19 and thereby form the joint 30D. This in turn makes it possible to improve bonding strength without providing any substrate for additional fixing or any mounting area on the side of the optical functional element 20 and thereby obtain the photonic integrated optical device 100D butt-joined simply and easily with high accuracy.

Embodiment 2

Figure 5:
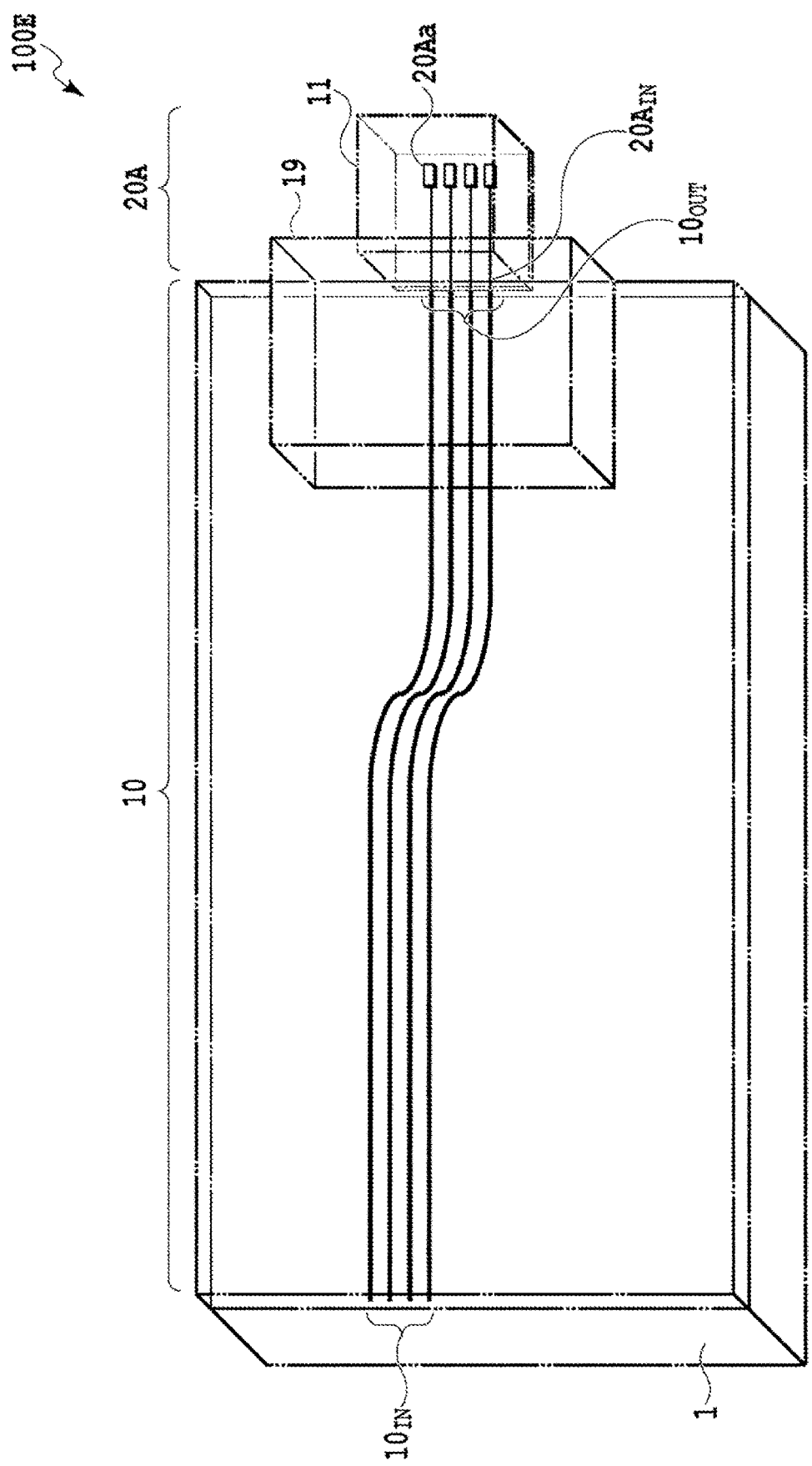
FIG. 5 is a perspective view showing a basic configuration of an photonic integrated optical device according to Embodiment 2 of the present invention as viewed obliquely from above.

FIG. 5 is a perspective view showing a basic configuration of an photonic integrated optical device 100E according to Embodiment 2 of the present invention as viewed obliquely from above.

Referring to FIG. 5, the photonic integrated optical device 100E differs from the photonic integrated optical device 100D in that a PD 20A is used for the optical functional element 20. Regarding the PLC 10, whereas a light input unit $10_{IN}$ and light output unit $10_{OUT}$ for the core layer 3 are shown here, the substrate 19 is provided on top of the optical circuit here again. Regarding the PD 20A, an input optical waveguide unit $20A_{IN}$ and a Ge-based photoelectric conversion unit 20Aa are shown. Again, in the photonic integrated optical device 100E, the UV-cure adhesive is filled into a gap between the optical circuit of the PD 20A and the optical circuit of the PLC 10 and a gap between the end face of the substrate 11 of the PD 20A and the end face of the substrate 19. Consequently, the joint 30D is formed with the UV-cure adhesive being cured.

A Si substrate 1 measuring 5 mm in length, 10 mm in width, and 1 mm in board thickness was used for the silica-based PLC 10 making up the photonic integrated optical device 100E. A $SiO_2$ underclad layer 2 with a layer thickness of 20 μm, a SiO2 core layer 3 with a core width of 4.5 μm and a film thickness of 4.5 μm, and a $SiO_2$ overclad layer 4 with a layer thickness of 15.5 μm were laminated on top of the substrate 1. The optical circuit configured in this way may be called a PLC chip. Here, an optical waveguide was formed by the core layer 3 such that the core of the core layer 3 will differ by 2.0% in index of refraction from the overclad layer 4 and the underclad layer 2. The PLC 10 receives input of light through the light input unit $10_{IN}$ provided on a short side by being formed by the core layer 3 serving as the optical waveguide, and outputs the light through the light output unit $10_{OUT}$ formed on a short side on the opposite side when viewed from the light input unit $10_{IN}$ after the light has propagated through the core layer 3. That is, four channels of the optical waveguide are installed with a pitch of 250 μm here and are each provided with an S-shaped structure running in a route from the light input unit $10_{IN}$ to the photoelectric conversion unit 20Aa of the PD 20A.

A Si substrate 11 measuring 1.5 mm in length, 1.5 mm in width, and 0.625 mm in board thickness was used for the PD 20A to be butt-joined to the PLC 10. Then, a $SiO_2$ underclad layer 12 with a film thickness of 3.0 μm, a Si core layer 3 with a core width of 0.5 μm and a film thickness of 0.22 μm, and a $SiO_2$ overclad layer 14 with a film thickness of 1.5 μm were laminated on the underside of the substrate 11. The optical circuit configured in this way may be called a Si photonics chip. Here, a spot size converter is used for the input optical waveguide unit $20A_{IN}$ and a mode field diameter (MFD: full width which makes intensity equal to $1/e^2$ in a light intensity distribution) of the spot size converter is 3 μm both in vertical and horizontal directions of the PD 20A.

The light inputted through the input optical waveguide unit $20A_{IN}$ propagates through the core layer 13 and is converted into an electrical signal by the photoelectric conversion unit 20Aa. Light sensitivity of each light-receiving unit of the PD 20A excluding optical coupling loss is 1.0 A/W at a wavelength of 1.55 μm.

The butt-joint holding substrate 19 measuring 3 mm in length, 2 mm in width, and 0.7 mm in board thickness is made of synthetic silica, which is a glass material, and is fixed to a top face of the PLC 10 with an adhesive such that an end face will be flush with a light output end face of the PLC 10. By making the substrate 19 larger in board thickness than the substrate 11 of the PD 20A, it is possible to bond the entire end face of the PD 20A and thereby improve bonding strength.

To butt-join the PD 20A to the PLC 10 equipped with the substrate 19, the substrate 1 of the PLC 10 and the substrate 11 of the PD 20A are placed in a diagonal direction with respect to the layer surfaces of the respective core layers 3 and 13 of the PLC 10 and PD 20A. Subsequently, the butt-joining end faces of the PLC 10 and the PD 20A are prealigned by being observed from above and below. Furthermore, to maximize the light sensitivity of the PD 20A to the light outputted from the light output unit $10_{OUT}$ of the PLC 10, precise alignment is performed such that the position of the output light from the core layer 3 of the PLC 10 will accurately match the position of the input light to the core layer 13 of the PD 20A. In so doing, alignment can be performed effectively if observation is carried out obliquely upward through the substrate 19.

Then, to fix the butt-joint between the PD 20A and the PLC 10, the gap between the PLC 10 and the PD 20A is filled with a UV-cure adhesive transparent to the infrared region and close in index of refraction to the core layer 3, overclad layer 4, and underclad layer 2 of the PLC 10. Subsequently, as shown in FIG. 4(b), UV light is irradiated obliquely from above via the substrate 19 to cure the adhesive, thereby forming the joint 3D. If a transparent substrate 19 that transmits light in the region ranging from the UV band to the visible light is used, the entire butt-joining end face of the PD 20A can be irradiated by UV light, making it possible to cure the UV-cure adhesive sufficiently and directly check filling condition of the UV-cure adhesive and connection state of the butt-joining end face of the PD 20A. To enable making such direct checks by means of a camera or the like, desirably a surface of the substrate 19 serving as an observation path is a polished surface so as to allow observation of the butt-joining end face as well as to be transparent to light in the region ranging from the UV band to the visible light. In so doing, desirably an antireflection film having an index of refraction corresponding to the index of refraction of the UV-cure adhesive to be filled is provided on an input/output end face of the PD 20A.

Figure 6:
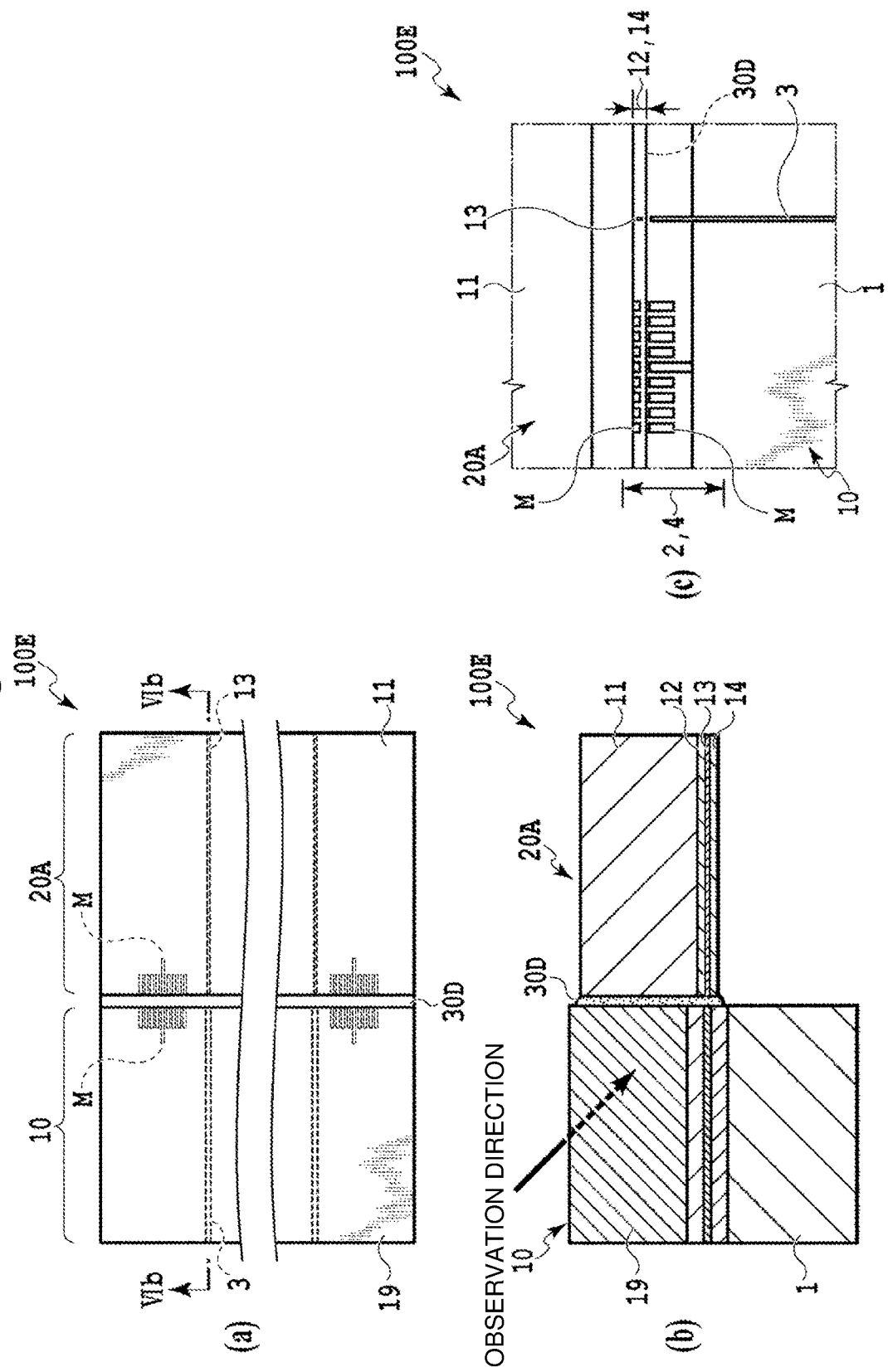
FIGS. 6(a) to 6(c) are enlarged views showing a butt-joined portion of the photonic integrated optical device shown in FIG. 5, where

Whereas the prealignment described above is normally performed from above and below through camera observation, a simpler and easier technique is applied in Embodiment 2. FIGS. 6(a) to 6(c) are enlarged views showing a butt-joined portion of the photonic integrated optical device 100E, where FIG. 6(a) is a top view of the butt-joined portion, FIG. 6(b) is a sectional side view taken along line VIb-VIb in FIG. 6(a), and FIG. 6(c) is a plan view of the butt-joined portion during prealignment with a marker used in a place where propagation of light through core layers 3 and 13 is not obstructed.

Specifically, as shown in FIG. 6(a), Au markers M for use during alignment are provided at least near an input/output end face of the core layer 3 of the PLC 10 and near an input/output end face of the core layer 13 of the PD 20A. Then, as shown in FIG. 6(b), if observation is carried out obliquely from above through the substrate 19 and adjustments are made such that patterns of the markers M will align with each other, prealignment can be performed without the need to prepare a camera for observation from below. If a butt-joining end face is observed obliquely from above, a pattern in a depth direction of the optical waveguide in the core layer 13 can be observed transparently through the underclad layer 12 of the PD 20A as shown in FIG. 6(c). If a vernier pattern is used as a pattern of the markers M and the scale width and vernier division are set to 10 μm and 0.5 μm, respectively, while the optical waveguide (core) in the core layer 13 of the PD 20A is 0.5 μm wide (which may be smaller) the markers M are reduced to such a size as to be easy to observe even through a camera. Consequently, along with vernier-based alignment, prealignment can be performed with high accuracy.

If the markers M are provided in two or more places near the end faces of the butt-joint and alignment adjustments are made such that patterns of the markers M will align with each other, rotation runout around an axis vertical to the butt-joining end faces can also be corrected. In this way, if markers M for alignment are provided near the butt-joining end faces of the PLC 10 and PD 20A, this is effective in improving alignment accuracy. The photonic integrated optical device 100E was produced in this way.

Figure 7:
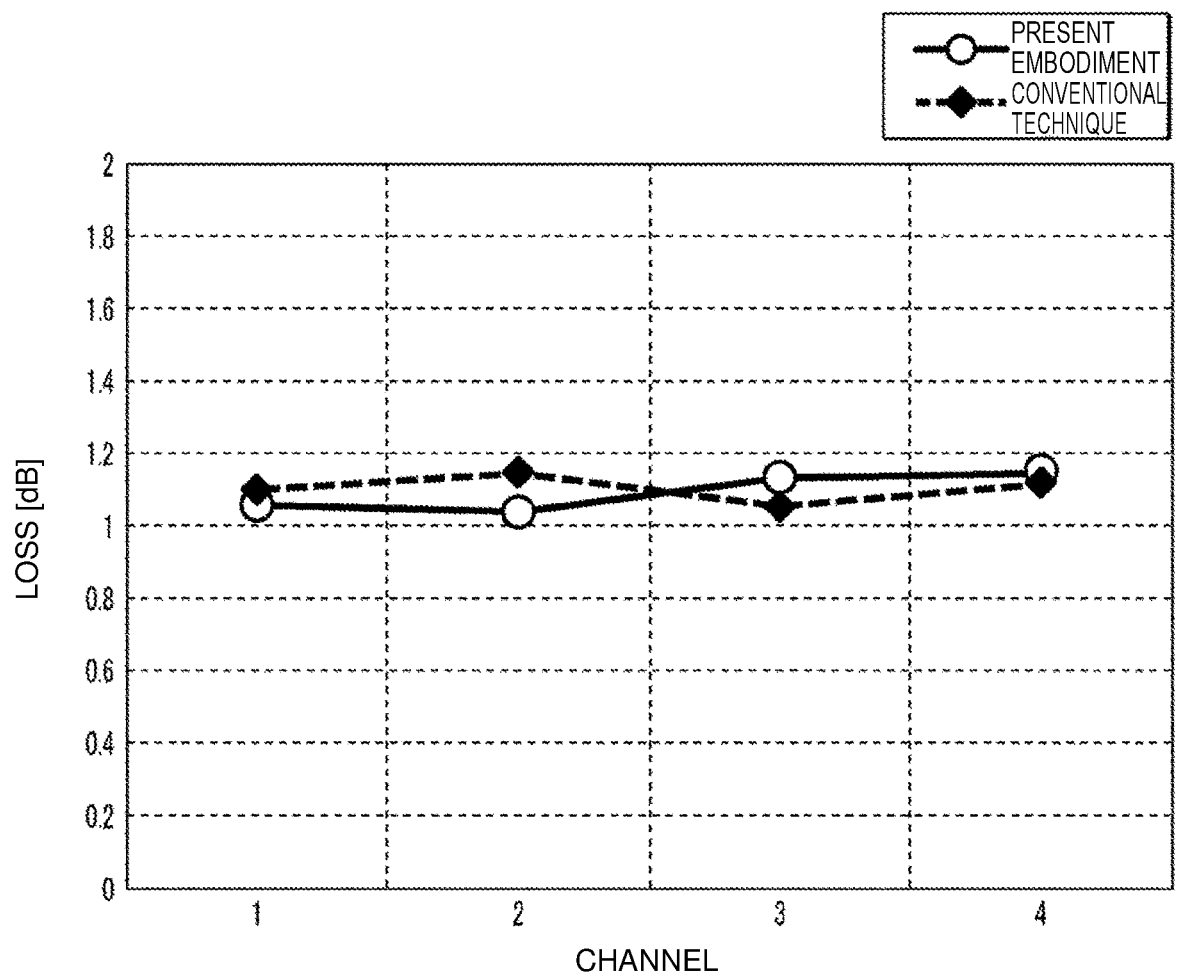
FIG. 7 is a diagram showing evaluation results on bonding strength as measured by optical coupling loss in the photonic integrated optical device shown in FIG. 5, where the loss is measured by applying a force to a PD in a direction horizontal to butt-joining end faces after light sensitivity of the PD is measured on a channel by channel basis.

FIG. 7 is a diagram showing evaluation results on bonding strength as measured by optical coupling loss [dB] in the photonic integrated optical device 100E, where the loss is measured by applying a force to a PD 20A in a direction horizontal to butt-joining end faces after light sensitivity of the PD 20A is measured on a channel by channel basis. However, FIG. 7 shows results of measuring the light sensitivity of the PD 20A on a channel by channel basis by inputting light with a wavelength of 1.55 μm to the PLC 10 of the photonic integrated optical device 100E through optical fiber, where the PD 20A is optically coupled via the joint 30D on the butt-joining end faces. Furthermore, subsequently, to evaluate bonding strength, shear testing was conducted by applying a force to the PD 20A in a direction horizontal to the butt-joining end faces and results of the testing are shown. In addition, by way of comparison, using the PLC 10 on which the same substrate 19 was not mounted and PD 20A, an photonic integrated optical device of a conventional configuration was produced by butt-joining the substrates 1 and 11 aligned with the layer surfaces of the core layers 3 and 13, and results obtained from the conventional photonic integrated optical device are shown for the sake of comparison.

Referring to FIG. 5, based on the light sensitivity of the PD 20A alone, there is little difference in the calculation results on the optical coupling loss and it can be seen that the photonic integrated optical device 100E according to Embodiment 2 can implement butt-joining equivalent to that of the conventional photonic integrated optical device. In the shear testing conducted to evaluate the bonding strength, with the conventional photonic integrated optical device, a mode in which the PD 20A and the UV-cure adhesive separated from each other occurred at 1.09 kgF. In contrast, with the photonic integrated optical device 100E according to Embodiment 2, it was found that although a separation mode occurred at the same point as the conventional photonic integrated optical device, the force at which separation occurred was 2.85 kgF. As a result, it was found that the photonic integrated optical device 100E exhibited improved bonding strength. These results confirmed that the photonic integrated optical device 100E provides a stable connection structure.

As described above, with the photonic integrated optical device 100E, in butt-joining the PLC 10 and the PD 20A, the butt-joint holding substrate 19 that transmits UV light is used on the side of the optical circuit on top of the substrate 1. Regarding the PD 20A, the substrate 11 is used by being turned over such that the underside of the substrate 11 will be on the top side, and the UV-cure adhesive is filled into the butt-joined portion, irradiated with UV light, and thereby cured, forming the joint 30D. That is, after the optical waveguides of the respective optical circuits are centered with respect to each other with the PLC 10 and the PD 20A being butted together, in forming the joint 30D by curing the UV-cure adhesive, the optical waveguides are butted together accurately to provide sufficient bonding strength in this structure. This makes it possible to implement hybrid integration of the PD 20A simply and easily using the optical circuit of the PLC 10 as a platform and provide the photonic integrated optical device 100E at low cost, where the photonic integrated optical device 100E allows high accuracy butt-joining of optical waveguides. In particular, in the case of the photonic integrated optical device 100E, the joint 30D is formed after performing alignment using the alignment markers M provided near the butt-joining end faces of respective optical devices in addition to using the butt-joint holding substrate 19. Consequently, the photonic integrated optical device 100E allows optical coupling to be performed more stably and accurately than does the photonic integrated optical device 100D according to Embodiment 1 and provides optical coupling characteristics with lower loss.

Embodiment 3

Figure 8:
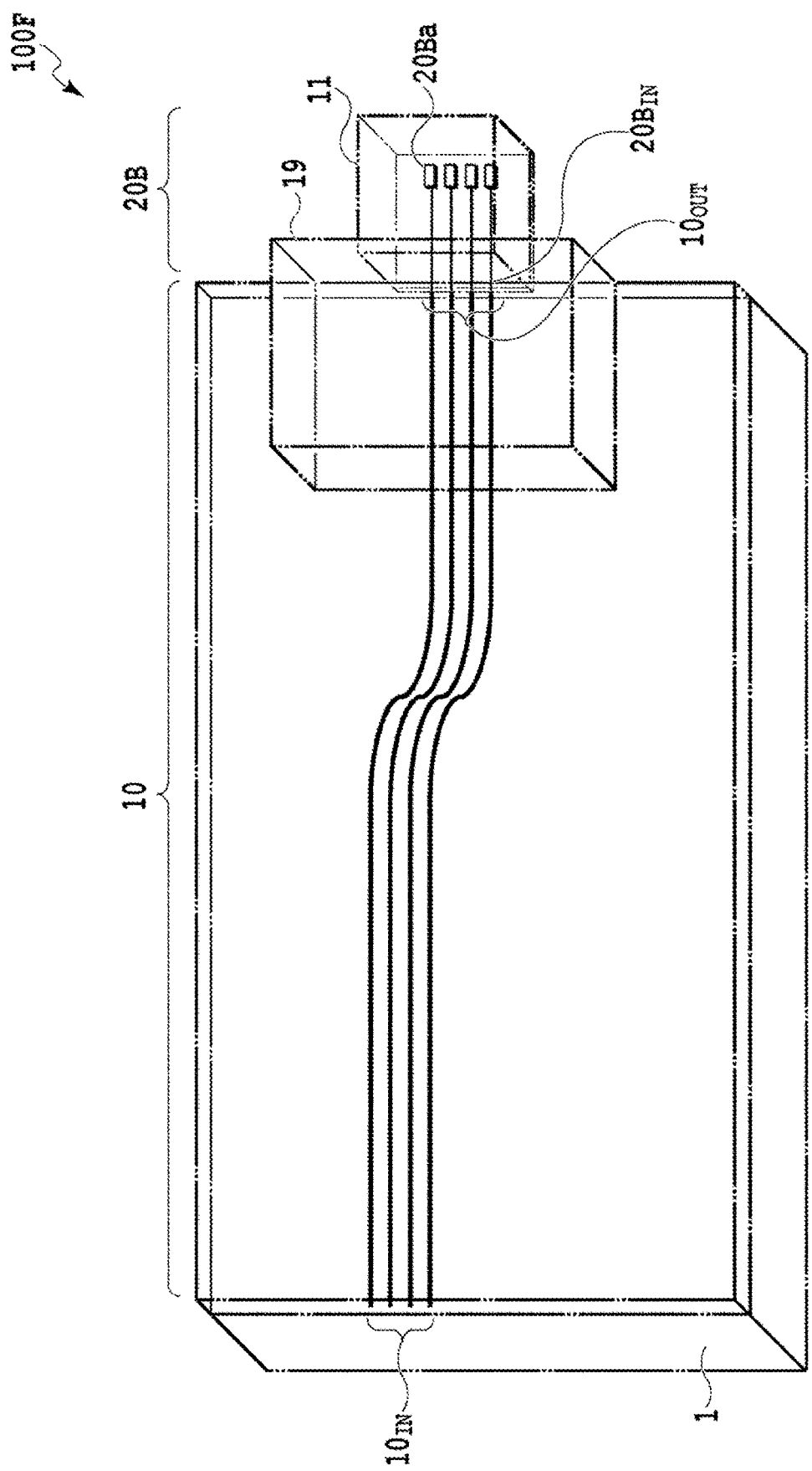
FIG. 8 is a perspective view showing a basic configuration of an photonic integrated optical device according to Embodiment 3 of the present invention as viewed obliquely from above.

FIG. 8 is a perspective view showing a basic configuration of an photonic integrated optical device 100F according to Embodiment 3 of the present invention as viewed obliquely from above.

Referring to FIG. 8, the photonic integrated optical device 100F differs from the photonic integrated optical device 100C in that a PD 20B is used for the optical functional element 20. Regarding the PLC 10, whereas a light input unit $10_{IN}$ and light output unit $10_{OUT}$ for the core layer 3 are shown here, the substrate 19 is provided on top of the optical circuit here again. Regarding the PD 20B, an input optical waveguide unit $20B_{IN}$ and a Ge-based photoelectric conversion unit 20Ba are shown. That is, the photonic integrated optical device 100F is generally the same as the photonic integrated optical device 100E in terms of external configuration. Again, in the photonic integrated optical device 100F, the UV-cure adhesive is filled into a gap between the optical circuit of the PD 20B and the optical circuit of the PLC 10 and a gap between the end face of the substrate 11 of the PD 20B and the end face of the substrate 19. Consequently, the joint 30D is formed with the UV-cure adhesive being cured. However, in the case of the photonic integrated optical device 100F, markers applied to devices during production up to butt-joining differ from those of the other photonic integrated optical devices. As an example, the markers are metal markers such as aluminum markers formed by processing metal layers provided on top of the optical circuit of the PLC 10 and optical circuit of the PD 20. Besides, a groove provided in a direction normal to the plane of the substrate 11 of the PD 20 is used for alignment, but this will be described later.

A Si substrate 1 measuring 5 mm in length, 10 mm in width, and 1 mm in board thickness was used for the silica-based PLC 10 making up the photonic integrated optical device 100F. Then, a $SiO_2$ underclad layer 2 with a layer thickness of 20 μm, a $SiO_2$ core layer 3 with a core width of 4.5 μm and a film thickness of 4.5 μm, and a $SiO_2$ overclad layer 4 with a layer thickness of 15.5 μm were laminated on top of the substrate 1. The optical circuit configured in this way may be called a PLC chip. Here, an optical waveguide was formed by the core layer 3 such that the core of the core layer 3 will differ by 2.0% in index of refraction from the overclad layer 4 and the underclad layer 2. The PLC 10 receives input of light through the light input unit $10_{IN}$ provided on a short side by being formed by the core layer 3 serving as the optical waveguide, and outputs the light through the light output unit $10_{OUT}$ formed on a short side on the opposite side when viewed from the light input unit $10_{IN}$ after the light has propagated through the core layer 3. That is, four channels of the optical waveguide are installed with a pitch of 250 μm here and are each provided with an S-shaped structure running in a route from the light input unit $10_{IN}$ to the photoelectric conversion unit 20Ba of the PD 20B. Whereas in the photonic integrated optical device 100E, the alignment markers M are provided near the input/output end face of the core layers 3 and 13, in the photonic integrated optical device 100F, a metal marker MM formed of an Au pattern is provided on a surface of the PLC 10.

A Si substrate 11 measuring 1.5 mm in length, 1.5 mm in width, and 0.625 mm in board thickness was used for the PD 20B to be butt-joined to the PLC 10. Then, a $SiO_2$ underclad layer 12 with a film thickness of 3.0 μm, a Si core layer 3 with a core width of 0.5 μm and a film thickness of 0.22 μm, and a $SiO_2$ overclad layer 14 with a film thickness of 1.5 μm were laminated on the underside of the substrate 11. The optical circuit configured in this way may also be called a Si photonics chip. Here, again a spot size converter is used for the input optical waveguide unit $20B_{IN}$ and a mode field diameter (MFD: full width which makes intensity equal to $1/e^2$ in a light intensity distribution) of the spot size converter is 3 μm both in vertical and horizontal directions of the PD 20B. The light inputted through the input optical waveguide unit $20B_{IN}$ propagates through the core layer 13 and is converted into an electrical signal by the photoelectric conversion unit 20Ba. Light sensitivity of each light-receiving unit of the PD 20B excluding optical coupling loss is 1.0 A/W at a wavelength of 1.55 μm. A metal marker MM formed of an Al pattern is provided on a surface of the PD 20B in such a position as to align with the metal marker MM on the PLC 10 at the time of alignment with the PLC 10. The reason why the Al metal marker MM is provided on the surface of the PD 20B whereas the Au metal marker MM is provided on the surface of the PLC 10 is that the production process of Si generally uses Al rather than Au, which is expensive.

A groove V is provided in a direction normal to the surface of the PD 20B, being exposed to an input end face of the PD 20B. The groove V is deep enough to reach an inner region of the substrate 11 of the PD 20B. The groove V coincides in position with a groove marker MV on the top face of the substrate 1 of the PLC 10 in a direction normal to the plane of the substrate 1. This structure allows for alignment in a height direction. Note that the groove V is provided in such a way as to reach an upper region of the end face of the butt-joined substrate 1. The depth of the groove V is adjusted by dry etching such that the height from the center of the core layer 3 of the PLC 10 to the top face of the overclad layer 4 will coincide with the depth of the center of the core layer 13 of the PD 20B to the inner region of the substrate 11 at the bottom of the groove V.

The butt-joint holding substrate 19 measuring 5 mm in length, 2 mm in width, and 0.7 mm in board thickness is made of synthetic silica, which is a glass material, and is mounted and fixed to the top face of the PLC 10 with an adhesive or the like such that the butt-joining end face will be flush with the light output end face of the PLC 10.

To butt-join the PD 20B to the PLC 10 equipped with the substrate 19, the substrate 1 of the PLC 10 and the substrate 11 of the PD 20B are placed in a diagonal direction with respect to the layer surfaces of the respective core layers 3 and 13 of the PLC 10 and PD 20B. Subsequently, the butt-joining end faces of the PLC 10 and the PD 20B are prealigned by being observed obliquely from above the PLC 10. Furthermore, to maximize the light sensitivity of the PD 20B to the light outputted from the light output unit $10_{OUT}$ of the PLC 10, precise alignment is performed such that the position of the output light from the core layer 3 of the PLC 10 will accurately match the position of the input light to the core layer 13 of the PD 20B. In so doing, alignment can be performed effectively if observation is carried out obliquely upward through the substrate 19.

Figure 9:
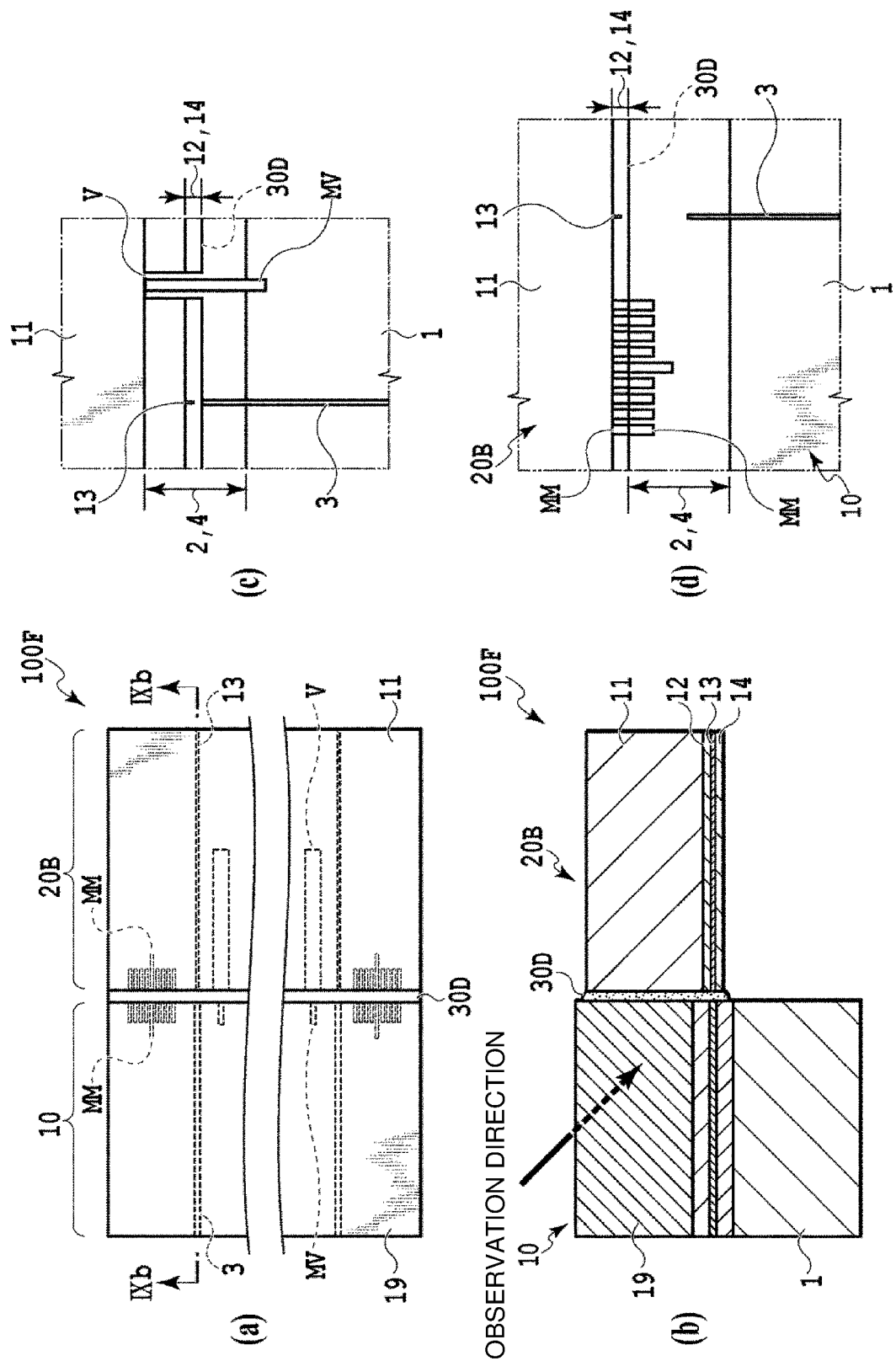
FIGS. 9(a) to 9(d) are enlarged views showing a butt-joined portion of the photonic integrated optical device shown in FIG. 8, where

In Embodiment 3, the prealignment described above is performed using the metal markers MM provided on the surface of the PLC 10 and the surface of the PD 20B. FIGS. 9(a) to 9(d) are enlarged views showing a butt-joined portion of the photonic integrated optical device 100F, where FIG. 9(a) is a top view of the butt-joined portion, FIG. 9(b) is a sectional side view taken along line IXb-IXb in FIG. 9(a), FIG. 9(c) is a plan view of the butt-joined portion during alignment using the groove and the groove marker MV, and FIG. 9(d) is a plan view of the butt-joined portion during prealignment using the metal markers MM.

The PLC 10, in which the core layer 3 has a small difference in index of refraction from the underclad layer 2 and the overclad layer 4, has a problem in that when the markers MM provided on the core layer 3 are observed, contrast of boundary surfaces between the core layer 3 and the underclad layer 2 and between the core layer 3 and the overclad layer 4 is low, resulting in a low resolution. Thus, as shown in FIG. 9(a), when the metal markers MM are provided on the surface of the PLC 10, a pattern of the metal markers MM can be checked more clearly. Thus, for more accurate alignment, desirably the metal markers are provided.

In the PD 20B, if the metal markers are located near the input/output end face of the core layer 13, the pattern of the metal markers MM in the depth direction of the core layer 13 can be checked transparently through the overclad layer 14. However, if the metal markers are located on the surface of the PD 20B, the pattern of the metal markers MM can be checked in an obliquely upward observation direction transparently through the combined thickness of the underclad layer 12 and overclad layer 14 as shown in FIG. 9(b). This makes it possible to visually recognize the depth direction farther and easily check the pattern of the metal markers MM, and thus desirably the metal markers MM are provided also on the surface of the PD 20B. If the butt-joining end face is observed obliquely from above, the pattern in the depth direction of the optical waveguide (core) in the core layer 13 can be observed transparently through the underclad layer 12 of the PD 20B as shown in FIG. 9(d). If a vernier pattern is used as a pattern of the metal markers MM and the scale width and vernier division are set to 10 μm and 0.5 μm, respectively, the metal markers MM are reduced to such a size as to be easy to observe through a camera. Consequently, along with the effect of providing the metal markers MM, prealignment can be performed with high accuracy.

If the metal markers MM are provided in two or more places near the butt-joining end faces and alignment adjustments are made such that the metal markers MM will align with each other, rotation runout around an axis vertical to the butt-joining end faces can also be corrected. In this way, if the metal markers MM for alignment are provided on the butt-joining end faces of the PLC 10 and PD 20B, this is effective in improving alignment accuracy.

In addition, according to Embodiment 3, as shown in FIG. 9(c), the use of the groove provided in the PD 20B and the groove marker MV provided in the PLC 10 makes it possible to perform alignment accurately in directions (height direction) normal to the planes of the substrates 1 and 11 as well. If alignment is performed such that the bottom face of the groove V in the PD 20B will align with the groove marker MV provided in a surface of the overclad layer 4 of the PLC 10, by passing through the substrate 19 obliquely from above, alignment in a direction normal to the butt-joining end faces of the substrates 1 and 11 can be performed in accordance with designed depth of the groove V.

Whereas the depth of the groove in the PD 20B is set such that the groove will align with the surface of the overclad layer 4 of the PLC 10, it is sufficient that the pattern is visually recognizable by being set to contact the input/output end face of the PLC 10. That is, it is presupposed that just after the prealignment, the core layers 3 and 13 of the PLC 10 and PD 20B are generally aligned in position with each other. Besides, regarding the depth of the groove in the PD 20B, it is sufficient that the distance from the center of the core layer 13 of the PD 20B to the bottom face of the groove V in the direction normal to the plane of the substrate 11 is set so as to coincide with the distance from the center of the core layer 3 of the PLC 10 to the pattern provided on the surface of the PLC 10 in the direction normal to the plane of the substrate 1.

To improve visibility, desirably the groove V runs to the butt-joining end face of the PD 20B. Secondary effects of this arrangement include the effect of keeping the UV-cure adhesive introduced into a gap between end faces from forming a large adhesive fillet at a connection on the surface of the PD 20B. In this way, the photonic integrated optical device 100F was produced.

Figure 10:
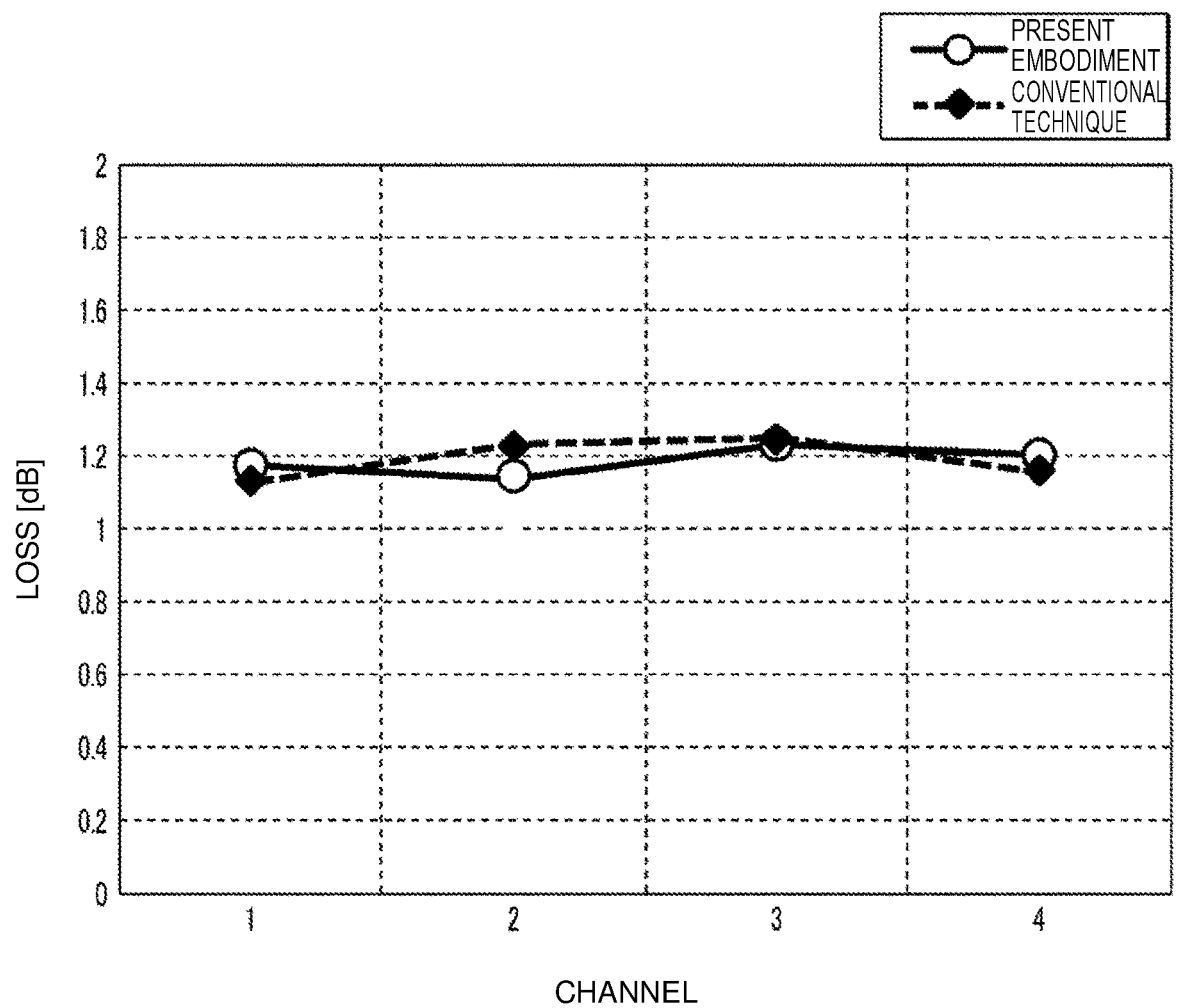
FIG. 10 is a diagram showing evaluation results on bonding strength as measured by optical coupling loss in the photonic integrated optical device shown in FIG. 8, where the loss is measured by applying a force to a PD in a direction horizontal to butt-joining end faces after light sensitivity of the PD is measured on a channel by channel basis.

FIG. 10 is a diagram showing evaluation results on bonding strength as measured by optical coupling loss [dB] in the photonic integrated optical device 100F, where the loss is measured by applying a force to a PD 20B in a direction horizontal to butt-joining end faces after light sensitivity of the PD 20B is measured on a channel by channel basis. However, FIG. 10, shows results of measuring the light sensitivity of the PD 20B on a channel by channel basis by inputting light with a wavelength of 1.55 μm to the PLC 10 of the photonic integrated optical device 100E through optical fiber, where the PD 20B is optically coupled via the joint 30D on the butt-joining end faces. Furthermore, subsequently, to evaluate bonding strength, shear testing was conducted by applying a force to the PD 20B in a direction horizontal to the butt-joining end faces and results of the testing are shown. In addition, by way of comparison, using the PLC 10 and PD 20B on which the same substrate 19 was not mounted, an photonic integrated optical device of a conventional configuration was produced by butt-joining the substrates 1 and 11 aligned with the layer surfaces of the core layers 3 and 13, and results obtained from the conventional photonic integrated optical device are shown for the sake of comparison.

Referring to FIG. 10, based on the light sensitivity of the PD 20B alone, there is little difference in the calculation results on the optical coupling loss and it can be seen that the photonic integrated optical device 100F according to Embodiment 3 can implement butt-joining equivalent to that of the conventional photonic integrated optical device. In the shear testing conducted to evaluate the bonding strength, with the conventional photonic integrated optical device, a mode in which the PD 20B and the UV-cure adhesive separated from each other occurred at 1.10 kgF. In contrast, with the photonic integrated optical device 100F according to Embodiment 3, it was found that although a separation mode occurred at the same point as the conventional photonic integrated optical device, the force at which separation occurred was 2.90 kgF. As a result, it was found that the photonic integrated optical device 100F exhibited improved bonding strength. These results confirmed that the photonic integrated optical device 100F provides a stable connection structure.

That is, with the photonic integrated optical device 100F, the substrate 19 is used for butt-joining to the end face of the PD 20B by being mounted on top of the substrate 1 of the PLC 10. Besides, during butt-joining, the substrate 1 of the PLC 10 and the substrate 11 of the PD 20B are placed diagonally with respect to the layer surfaces of the optical waveguides (core layers 3 and 13) of the respective optical circuits of the PLC 10 and the PD 20B. The metal markers MM and the groove marker MV are used for alignment between the butt-joining end faces of the PLC 10 and PD 20B with the substrate 19 being mounted on the PLC 10. Furthermore, after the alignment and subsequent centering that is performed using externally introduced light, the joint 30D is formed with the UV-cure adhesive being cured.

As described above, with the photonic integrated optical device 100F, in butt-joining the PLC 10 and the PD 20B, the butt-joint holding substrate 19 that transmits UV light is used on the side of the optical circuit of top of the substrate 1. Regarding the PD 20B, the substrate 11 is used by being turned over such that the underside of the substrate 11 will be on the top side, and the UV-cure adhesive is filled into a gap between the butted portions, irradiated with UV light, and thereby cured, forming the joint 30D. That is, after the optical waveguides of the respective optical circuits are centered with respect to each other with the PLC 10 and the PD 20B being butted together, in forming the joint 30D by curing the UV-cure adhesive, the optical waveguides are butted together accurately to provide sufficient bonding strength in this structure. This makes it possible to implement hybrid integration of the PD 20B simply and easily using the optical circuit of the PLC 10 as a platform and provide the photonic integrated optical device 100F at low cost, where the photonic integrated optical device 100F allows high accuracy butt-joining of optical waveguides. In particular, in the case of the photonic integrated optical device 100F, prealignment is performed using the alignment metal markers MM provided on a surface near the butt-joining end faces of respective optical devices in addition to using the butt-joint holding substrate 19. Subsequently, the joint 30D is formed by performing alignment in the height direction using the groove V provided in the PD 20B and the groove marker MV facing the groove V by being provided in the PLC 10. Consequently, the photonic integrated optical device 100F allows optical coupling to be performed still more stably and accurately than does the photonic integrated optical device 100E according to Embodiment 2 and provides optical coupling characteristics with lower loss.

The invention claimed is:

1. A photonic integrated optical device, comprising:
   a planar lightwave circuit made up of an optical circuit made of a material transparent to light in a wavelength region ranging from an ultraviolet band to a visible light band provided on top of a first main surface of a substrate made of a material non-transparent to light in the wavelength region ranging from the ultraviolet band to the visible light band;
   an optical functional element made up of an optical circuit made of the material transparent to light in the wavelength region ranging from the ultraviolet band to the visible light band provided on an underside of a second main surface of a substrate made of the material non-transparent to light in the wavelength region ranging from the ultraviolet band to the visible light band;
   a butt-joint made of the material transparent to light in the wavelength region ranging from the ultraviolet band to the visible light band, and holding substrate installed on top of the optical circuit of the planar lightwave circuit and used for joining by means of a ultraviolet-cure adhesive by being butted against an end face of the optical functional element;
   and
   a joint in which respective optical waveguides of the optical circuits are centered with respect to each other, the joint including the ultraviolet-cure adhesive used to butt-join the planar lightwave circuit and the optical functional element, wherein the joint is formed with the ultraviolet-cure adhesive being cured after being filled into a gap between the optical circuit of the optical functional element and the optical circuit of the planar lightwave circuit and a gap between an end face of the substrate of the optical functional element and an end face of the butt-joint holding substrate.

2. The photonic integrated optical device according to claim 1, wherein:
   the substrate of the planar lightwave circuit is made of Si or InP;
   the substrate of the optical functional element is made of Si or InP; and
   the butt-joint holding substrate is larger in board thickness than the substrate of the optical functional element and is made of a glass material transparent to light in the wavelength region ranging from the ultraviolet band to the visible light band.

3. The photonic integrated optical device according to claim 1, wherein an alignment marker for use during butting are provided at least in a neighborhood of an input/output end face of the optical circuit of the planar lightwave circuit and in a neighborhood of an input/output end face of the optical circuit of the optical functional element.

4. The photonic integrated optical device according to claim 3, wherein the alignment marker is provided on butt-joining end faces of the optical circuit of the planar lightwave circuit and the optical circuit of the optical functional element, but in such place that does not obstruct propagation of light through a layer on which the optical waveguide is formed.

5. The photonic integrated optical device according to claim 3, wherein the alignment marker is provided in at least two places on the butt-joining end faces.

6. The photonic integrated optical device according to claim 5, wherein the alignment marker is a metal marker formed by processing metal layers provided on top faces of the optical circuit of the planar lightwave circuit and the optical circuit of the optical functional element.

7. The photonic integrated optical device according to claim 6, wherein:
- a groove provided in a direction normal to a surface of the optical functional element is exposed to an input/output end face of the optical functional element;
- the groove is deep enough to reach an inner region of the substrate of the optical functional element; and
- the groove coincides in position with a groove marker provided on a top face of a substrate of the planar lightwave circuit, in a vertical direction of the substrate.

8. The photonic integrated optical device according to claim 7, wherein:
- the butt-joint holding substrate is used for butt-joining to the end face of the optical functional element by being mounted on top of the substrate of the planar lightwave circuit;
- during butt-joining, the substrate of the planar lightwave circuit and the substrate of the optical functional element are placed diagonally with respect to layer surfaces of the optical waveguides of respective optical circuits of the planar lightwave circuit and the optical functional element;
- the metal marker and the groove marker are used for alignment on butt-joining end faces of the planar lightwave circuit to which the butt-joint holding substrate is mounted and fixed and the optical functional element; and
- the joint is formed with the ultraviolet-cure adhesive being cured after the alignment and subsequent centering that is performed using externally introduced light.

\* \* \* \* \*